United States Patent [19]
Viegener

[11] Patent Number: 6,119,719
[45] Date of Patent: Sep. 19, 2000

[54] GENERAL-PURPOSE VALVES, PREFERABLY VALVES FOR FAUCET SETS

[76] Inventor: Francisco Enrique Viegener, 1053 Bernardo de Irigoyen Street-1602 Florida, Buenos Aires State, Argentina

[21] Appl. No.: 09/290,168

[22] Filed: Apr. 13, 1999

[51] Int. Cl.[7] .................................................. F16K 5/08
[52] U.S. Cl. ........................................ 137/454.5; 251/310
[58] Field of Search .......................... 137/454.5; 251/310

[56] References Cited

U.S. PATENT DOCUMENTS

| | | | |
|---|---|---|---|
| 3,080,146 | 3/1963 | Lombardi | 251/310 |
| 3,542,336 | 11/1970 | Giese | 251/310 |

*Primary Examiner*—Stephen M. Hepperle
*Attorney, Agent, or Firm*—Michael D. Bednarek; Shawpittman

[57] ABSTRACT

A general purpose valve in which liquid flow is conrolled through rotating a handle or lever arm. The valve includes a valve body with a fluid inlet placed at the bottom of a head housing chamber as a removable cartridge of an assembly of a corresponding shutter operatively related to an intercommunicating duct from the inlet to the outlet of the chamber. The cartridge head being removable fitted into the chamber. A fitting is established through the use of a complementary cap attached to the base with a central hole that matches both the inlet and the outlet hole of the intercommunicating duct formed on the shutter body.

20 Claims, 5 Drawing Sheets

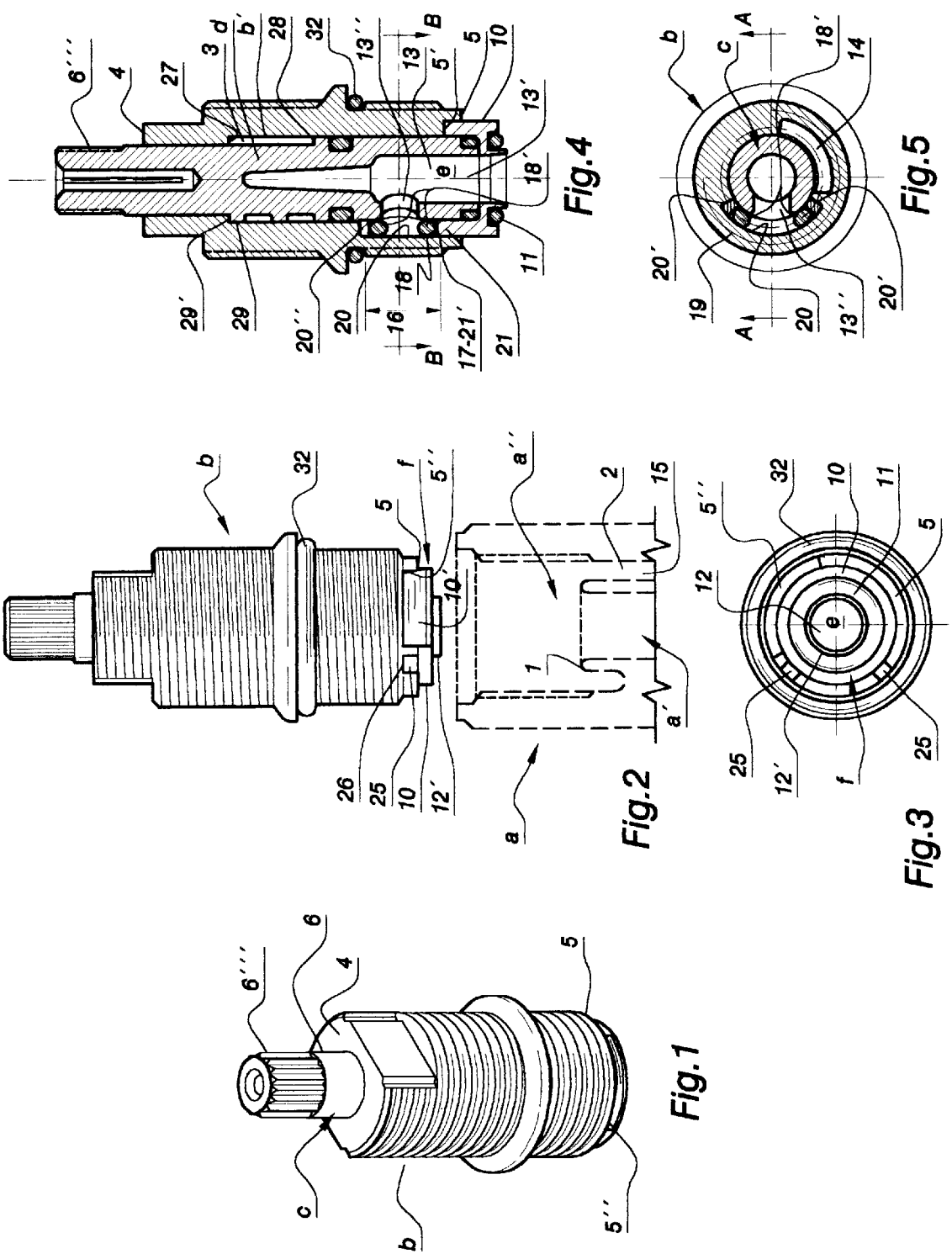

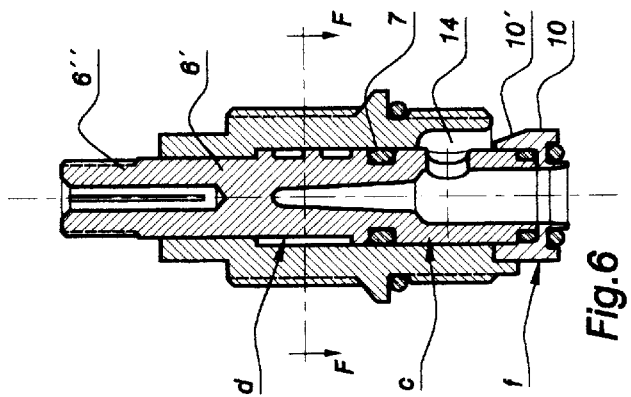
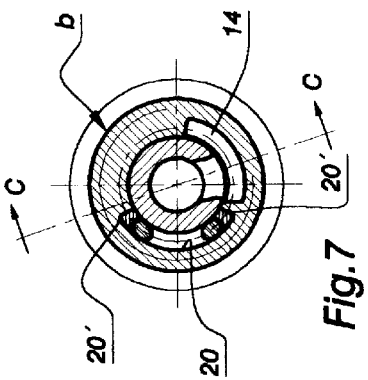
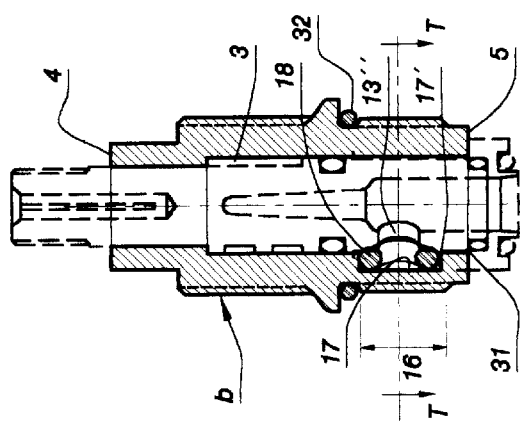
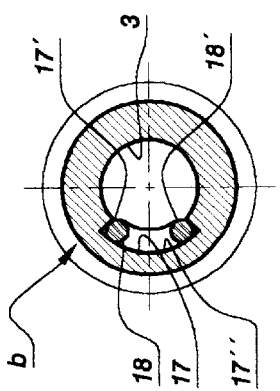
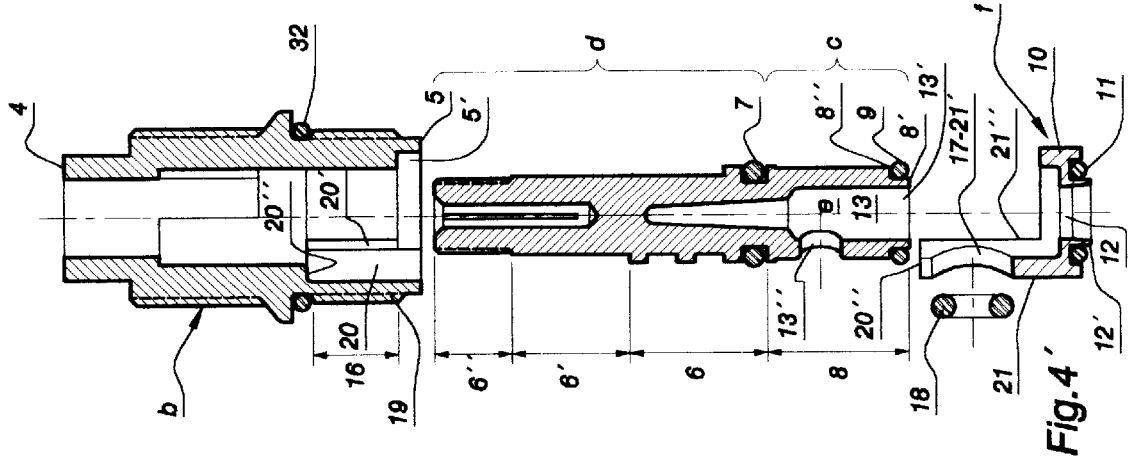

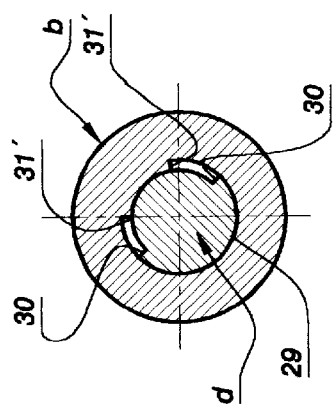
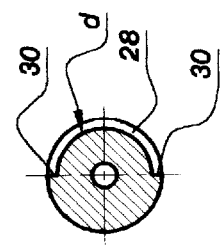
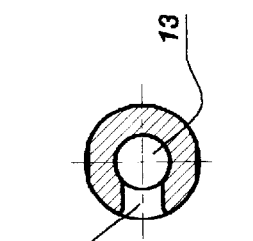
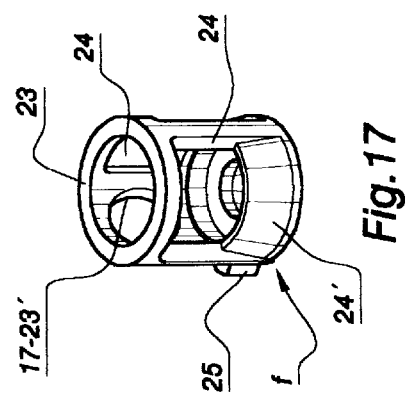
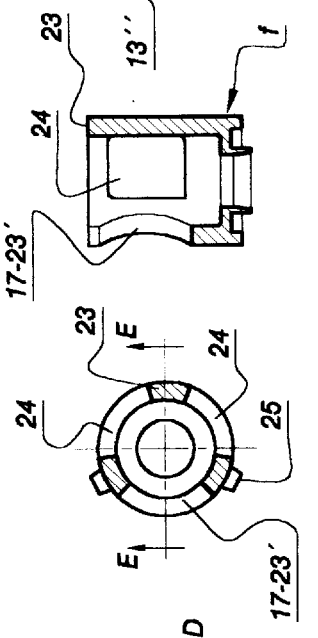
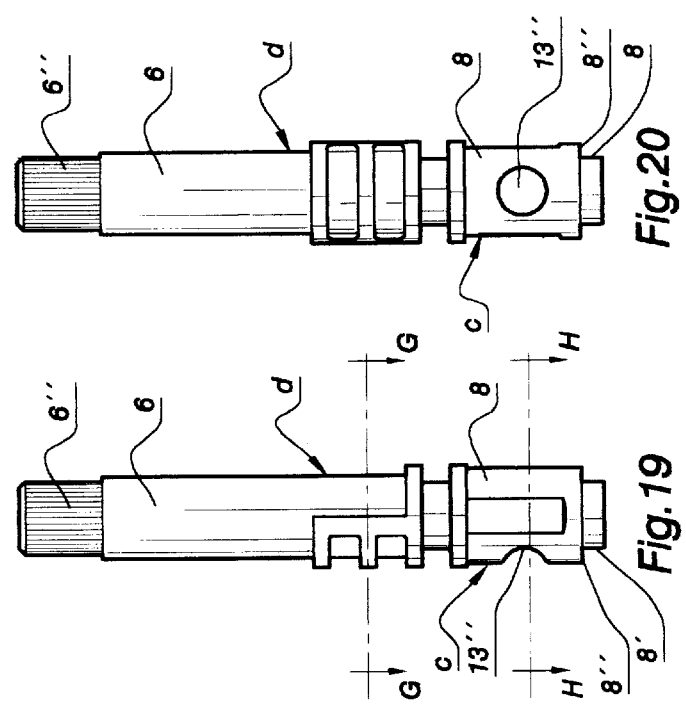
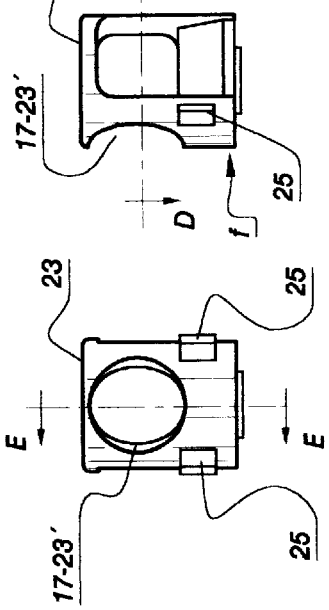

GENERAL-PURPOSE VALVES, PREFERABLY VALVES FOR FAUCET SETS

The present invention relates to improvements in general-purpose valves. Preferably the present invention relates to valves for faucet sets wherein liquid flow is controlled by partially rotating a manually actuated handle, a lever arm or the like; the valve comprising a valve body with a fluid inlet placed at the bottom of a head housing chamber as a removable cartridge of an assembly of a matching shutter in operative relation to an intercommunicating duct from said inlet to an outlet to this chamber; the cartridge-head being removably fixed within said chamber, and airtightly fits into a spandrel, both above the level of said outlet and on its lower base, around said inlet.

When said valves are made of metal, cartridge-heads finished with a metal shutter having a 90° or larger turn, are used, but they are called ceramic or ceramic-seal for said shutter comprises a couple of ceramic discs resiliently juxtaposed between each other, a stationery disc and a movable disc with a ¼-turn; said discs being highly effective, but proportionately expensive which is a restricting factor for widespread use of faucet sets including this type of shutters, since said head is the piece that accounts for the highest percentage of total costs, also in luxurious sets.

The same happens, in a lower but not less significant degree, when the head-shutter assembly is completely made of metal with an elastomeric disc seal or the like, the disc does not rotate together with its actuating spindle but shifts up and down relative to the bedding, thus opening and closing water flow therethrough with one or more turns of the respective handle.

Consequently, in any case, this is a highly cost-sensitive item which costs there is a need to drop as much as possible without impairing faucet efficacy, life, yield, etc.

Several attempts have been made to drop costs of these commonly used faucet sets by making a plastic bibcock body, but it has been necessary to use cartridge-heads based on similar designs, in order to ensure airtight sealing between said inlet and outlet. All attempts to provide a sealing head assembled comprising entirely plastic pieces have required, for instance, a bibb-type arrangement, said pieces being machined to obtain suitable fitting surfaces tapered relative to, at least, the control section of chamber inlet.

According to other arrangements developed in the attempt of getting a safer, longer lasting effective sealing said inlet using plastic pieces, said inlet has been furnished with an elastomeric bedding or the like, under the action of a spring pressing against a shutter plate rotatably mounted, in turn pressing against said bedding by means of another spring and furnished with a sealing eccentric section in said inlet, and also an eccentric hole for the liquid to flow therethrough from said inlet to the said outlet of a chamber, angularly out of phase between each other.

Whatever the arrangement adopted, in no case it has been possible to produce a completely plastic cartridge-head that delivers equivalent safety properties in airtight sealing using molded pieces just as they come out of the die, as it happens with ceramic heads.

Inevitably, either further adjustment of said pieces in a stage prior to assembly is necessary, or complementary elements, such as springs or other pieces, etc. must be used, wear causing sealing capability of said pieces to decrease and, obviously, this brings about an important factor in head costing. This factor, along with uncertain sealing efficacy restricts employment of this material to valves for medium or low cost faucet sets.

It should be noted that plastic heads obtained from configurations known so far may, by no means, be used in the bodies of metal faucet sets since they fail to meet standards in force for common metal heads.

SUMMARY OF THE INVENTION

It should be first noted that valves produced applying the inventive improvements are removable, so all of their operative members are completely assembled and contained within a mounting head or an assembly-carrying cartridge, which can be easily attached to and dismounted from said housing chamber in the valve body wherein it is interposed between inlet and outlet.

As for the aforementioned, it must be stated that it is a basic object of the invention to obtain a head having a shutter that rotates a ¼-turn or a bit more, the shutter being of very simple arrangement based on a few elements, all of them of simple and easy fabrication, so they may be completely molded in plastic; following production they can be promptly assembled with neither prior finishing nor adjustment, the incorporation of "O-rings" being enough for the head to remain in condition of prompt application either on metal or plastic valve bodies.

It is a basic feature of the present invention a novel, innovative arrangement wherein a single "O-ring" allows fluid inlet to be sealed in such a way that wear does not alter it. Also the way of assembling said "O-ring", its retention and the possibility of replacing it as many times as desired, if necessary, feature the present invention. A great number of experiences permitted to prove that completely plastic cartridge-head of this invention keeps its sealing capability with a single "O-ring".

This is so, that after many, hundreds of thousands, operative cycles of opening and closing, all components of the assembly have proved to remain in excellent operative conditions, without leakage.

The cartridge-head resulting from the application of the improvements of this invention has been designed in order to obtain a compact assembly formed by a few pieces at low cost while keeping a high efficacy degree.

This cartridge-head has been designed for completely plastic assemblies that may be used as removable cartridge-heads in faucet sets completely made of metal.

BRIEF DESCRIPTION OF THE DRAWINGS

For clarity and better understanding of the valve resulting from the application of the invented improvements, the present invention is illustrated by way of example according to two preferred embodiments, wherein:

FIG. 1 shows a top perspective view of the cartridge-head comprising all operative components of the valve made and arranged according to the invented improvements.

FIG. 2 shows an outer elevation view of said cartridge-head being dismounted from its housing chamber in the valve body.

FIG. 3 shows a bottom plan view.

FIG. 4 shows an elevation, longitudinal section view taken along line A—A of said cartridge-head with the shutter-spindle assembly in the closing position, according to a first exemplary embodiment of the dummy piece carrying the "O-ring" that seals the outlet of the shutter arranged in the closing position.

FIGS. 4' and 4" shows an exploded view of FIG. 4.

FIG. 5 is a plan, cross-sectional view taken along line B—B according to the closing position of FIG. 4.

FIGS. 4' and 5', are each partial, schematic views of FIGS. 4 and 5, showing, for better understanding, the way the "O-ring" is applied to seal shutter outlet, in its respective housing recess, as if it were directly formed on the wall of the body of the cartridge-head, dispensing with the shutter, the spindle and the carrier (the "O-ring" holder) for a better understanding.

FIG. 6 also shows an elevation, longitudinal section view taken along line C—C of the same embodiment of the cartridge-head as shown in FIG. 4, but having the shutter-spindle in the opening position.

FIG. 7 shows the same plan, cross sectional view taken along line B—B as in FIG. 5, but the shutter-spindle being in the opening position according to FIG. 6.

FIGS. 13 to 17, show a front view, a lateral view, a cross-section view taken along line D—D, a longitudinal section view taken along line E—E and a perspective view, respectively, of the piece carrying the "O-ring" that seals shutter outlet, all according to the second exemplary embodiment of this piece illustrated in FIGS. 9 and 12.

FIG. 18, is a plan, cross-sectional view taken along line F—F showing the way spindle stops and cartridge-head stops are formed, which determine the closing and opening positions of shutter, said shutter being in an intermediate position.

FIGS. 19 and 20, each shows outer elevation views showing two aspects of the shutter-spindle assembly being dismounted relative to the body of the cartridge-head.

FIGS. 21 and 22 each shows views complementary to FIGS. 19 and 20 above, showing cross-sections taken along lines G—G and H—H of shutter and spindle, respectively.

FIG. 23' shows a cross-sectional view taken along line J—J of the body of the cartridge-head according to FIG. 23, showing the section of its internal protrusion of side stop for the spindle.

In all figures like reference characters identify correspondingly throughout.

DESCRIPTION

Figure 9:
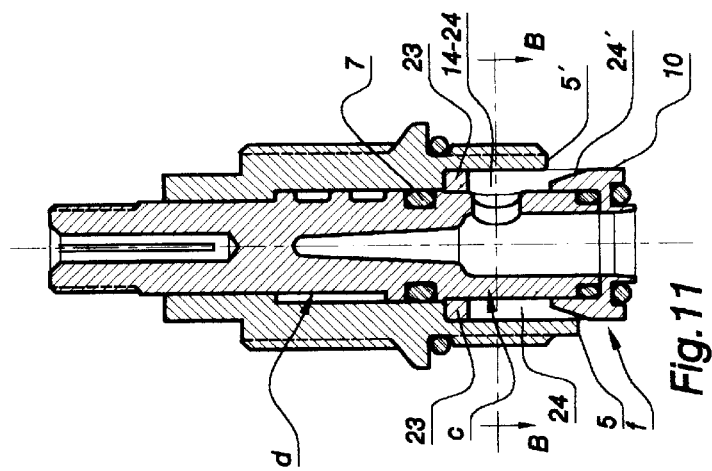
FIGS. 9, 10, 11 and 12 show same views as FIGS. 4, 5, 6, and 7, but according to a second exemplary embodiment of said dummy piece carrying the "O-ring" that seals the outlet of shutter duct.
Figure 10:
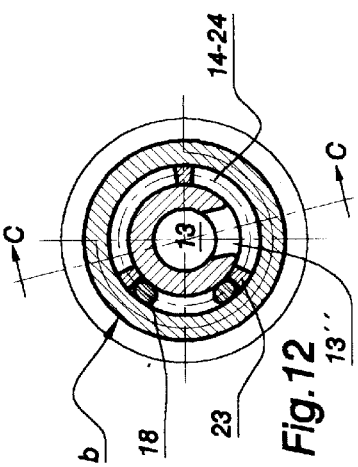
Figure 11:
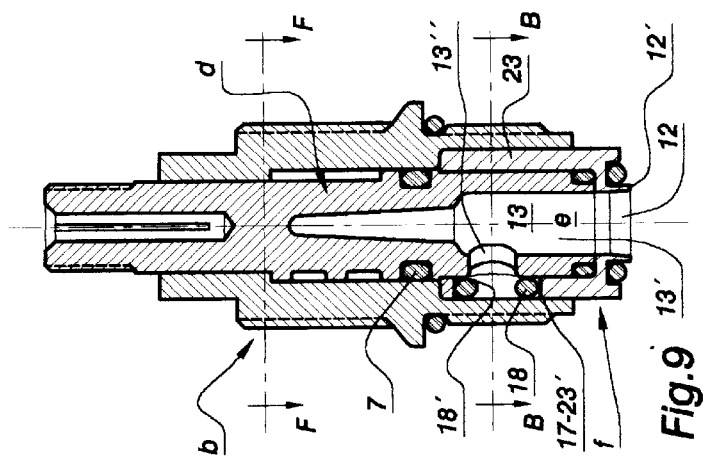
Figure 12:
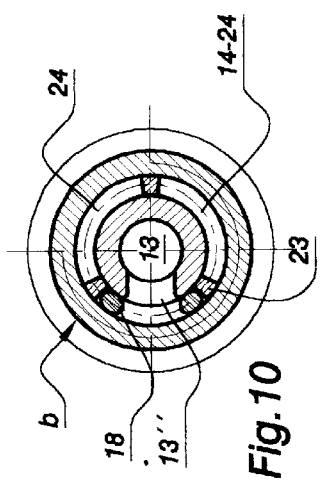

According to explanation and illustration above, invented improvements have been developed in relation to a valve, which according to its general features comprises a valve body a with a fluid inlet a' placed at the bottom of a chamber a" housing a cartridge-head b of a mounting of a rotatory shutter c with a respective manually actuated spindle d and operatively attached to a duct e intercommunicating said inlet a' with an outlet a" in said chamber, the chamber being on a side of a bedding 1 encircling said inlet a' and communicating with a derivation 2 of the valve body towards the respective outflow spout.

According to the preferred exemplary embodiment of the invented improvements, which are to be considered as focused on the assembly that comprises mounting head b, shutter c and spindle d, the body of the head presents a longitudinal housing b' of said spindle, defined by a cylindrical bore 3 opened through both, upper 4 and lower 5 basis, of the body thereof, matching which shutter c and spindle d are formed by a single proportionally narrow, long and cylindrical body adapted with slip fitting, inserted through hole 3' of said bore into the lower base 5 till it axially and internally stops through an upper leg 6, which forms the spindle itself, and together with the head, present cooperative stops that limit rotation of said spindle relative to said head, reference to which is made herebelow; a protrusion 6' of this upper leg of said spindle projects relative to said upper base 4, to end in a stem 6" where the actuating handle will be attached.

An "O-ring" 7 seals the joint between said leg 6 and said housing-hole 3 thus preventing any outward leakage from said housing-hole through said upper base of the head.

The other leg 8, forming shutter c, protrudes through its lower end 8' relative to the same base 5 of the body of head b, presenting a narrowing 8" where an "O-ring" 9 is attached to seal engagement of said leg within a short, but proportionally wide annular cap f which is fittingly inserted in a cooperative engagement 5' of said lower base 5 of head through the upper periphery of its respective side wall 10, said cap being formed by a widening of said housing-hole 3, and said cap partially protrudes from said housing-hole establishing an axial stop between said periphery and the step formed by this widening, such as can be seen in the drawings (FIG. 4).

Figure 25:
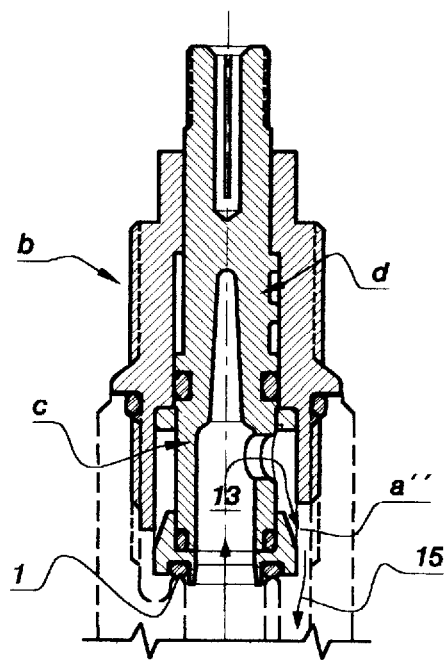
FIG. 25 is an elevation, longitudinal section view with the cartridge-head of the present invention being applied to a housing in the valve body with the shutter in the opening position according to exemplary FIGS. 9 to 24.

Said cap f so applied is an integral part of head b, the bottom of said cap f providing a respective fitting bedding into bedding 1 of the valve body that encircles inlet a', all that in such a way that when the head is completely screwed within the chamber by winding up the cooperative threads on both of them, the lower base 5 rests on said bedding 1 by way of the bottom of said cap through an "O-ring" 11 applied in an annular groove thereof, thus establishing an airtight seal between the head base, complemented by said cap, and valve body a, which prevents any fluid leakage from said inlet a' directly to adjacent outlet a'" (FIG. 25).

In this way, to flow from inlet to outlet, water is made to pass through a pipe proper of the shutter which constitutes said intercommunicating duct e when said intercommunication duct turns to the opening position, as herebelow explained, after it is clearly established that according to the teachings and illustrations above, spindle d and shutter c are constituted by said legs 6 and 8, respectively, of the same long, rectilinear body of a proportionally narrow circular section.

The bottom of said cap f presents a short central duct 12 with a short tube-shaped projection 12' which, as a nozzle, is plugged into inlet a', thus establishing a coupling that ensures permanent intercomunication between the respective valve body inlet duct and lower end 13' of a central, longitudinal duct 13 of shutter leg 8, in any rotation position thereof, which finishes in a blind upper end with a side outflow spout 13", on the cylindrical surface thereof, over which, while in the opening position, it communicates with a water trap 14 formed on the side surface of the wall of said housing-hole 3 of the head, the trap is closed on its upper end and opened in the lower end of the lower base 5 thereof, on a side of side wall 10 of said cap f, thus establishing a permanent communication with the respective outflow spout 15 proper of the valve body, through outlet a'" of its chamber, for which there is no arrangement limitation, since these improvements are irrespective the embodiment adopted for said outflow spout (FIGS. 6–11–25).

As from the aforesaid it is apparent that said duct 13 forms said duct e intercommunicating inlet and outlet of the chamber.

Figure 24:
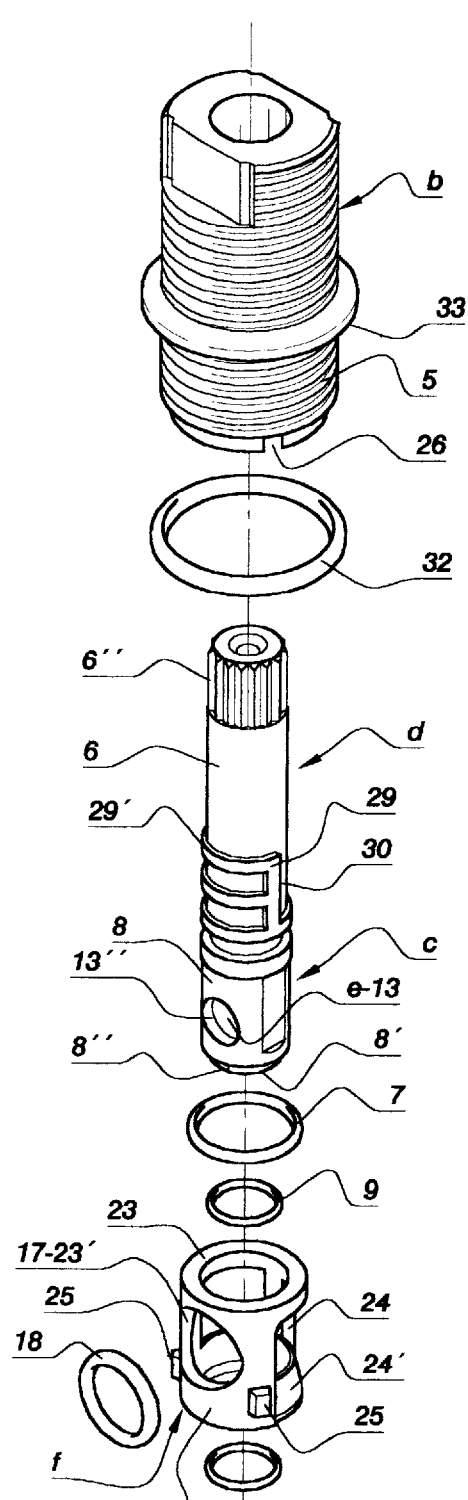
FIG. 24 shows a perspective, exploded view of the set of elements forming the cartridge-head according to the embodiment of FIGS. 9 to 12.

As an illustrative example, it should be noted that said outflow spout 15 may be of the type wherein the outflow spout is annularly formed around the tube-shaped portion of the valve body that delimits the inlet duct and finishes at inlet a', therefrom going to the usual lower outlet that bibcocks are furnished with, towards the piece interconnecting with the socket, for instance in the "T" piece of the two-bibcock faucet sets which join together in a single spout, such as illustrated in the example (FIG. 24).

In other cases, said outflow spout will comprise an annular chamber around the head base from which a duct leading to the socket of said "T" piece is laterally derived.

It should be noted that said cartridge-head may be applied relative to any valve body that supplies the inlet formed as described and illustrated, in the bottom of the housing thereof, by means of a tube-shaped nozzle or equivalent arrangement, for instance a simple annular shoulder over which the "O-ring" 11 of cap f bottom will be fitted.

Going back to the basic features of said improvements, it should be pointed out that rotation of the spindle-shutter is restricted to, at least, a 90° angle, 102° in the example, between its opening position, in which the outlet 13" of duct 13 matches said spout 14, and its closing position, in which said outlet 13" faces a section 16 of the cylindrical surface of hole 3 wherein it is housed; in theory said surface, when in perfect screwing between said surface and spindle should be enough to establish shutting of said outlet 13" and thus to seal any fluid leakage from said duct 13 of spindle c towards outflow spout 14–15, that may leak around the spindle-shutter. In practice, machining and/or finishing and natural wear tear of said type of shutting does not ensure against liquid leakage, and even less when pieces are molded in plastic material, where it is necessary to find a way of compensating the unavoidable diameter gap between shutter and the hole containing said shutter, which results from the molding process.

Consequently, and in order to ensure a watertight sealing of said outlet 13", irrespective of eventual initial backslash or clearance between both surfaces and that which may result from wear, the following inventive arrangement has been designed:

Said section 16 of hole surface 3 presents a groove 17, within the height where outlet 13" of the spindle duct c rotates; said groove being wider than said outlet; said outlet has a similar configuration, and housing an "O-ring" 18 that reproduces same configuration of the groove and establishes an airtight sealing strip 18' with the side surface of shutter; when said shutter remains in the closing position, the sealing strip completely encircles outlet 13", so section of wall of head b that comprises said groove 17, acts as a true plug for the groove, but without sealing free rotation of the spindle-shutter towards the opening position, when actuated in this direction.

On the other side, at least the whole strip of the cylindrical surface of spindle where said outlet 13" of spindle is formed, offers a finishing intended to be as much as a glass polishing as possible; an attempt is made to achieve a finishing that prevents the "O-ring" from eroding, which modern dies permit now to be obtained.

With this arrangement and a simple ¼-turn, shutter shifts from closing (FIG. 5) to opening (FIG. 7) positions and conversely, with a progressive flow rate according to the speed of turn. Regulation is possible by reducing turn extent.

For a better understanding of how the arrangement above works, schematic FIGS. 4" and 5' are each enclosed (from FIGS. 4 and 5 which will be referred to below when explaining the practical embodiment of this invention) wherein said kit of elements has been limited to the body of the cartridge-head b; shutter c and stem d have been avoided for clarity sake, as if groove 17 were directly formed on the wall of said head from inside housing-hole 3.

Such as shown in these drawings, groove 17 has a spandrel on the concave-cylindrical surface of said housing-hole 3 matching a flank 17' thereof against which said "O-ring" 18 is fitted by natural resilient reaction resting against bottom 17" of the groove which has a substantially uniform depth, at least along this flank, which is featured to retain said "O-ring" within the groove; for retaining said "O-ring" the width of said groove, considered according to plane T—T transversal relative to said hole (which passes through the groove's center) or more exactly the gap between both opposite legs of the flank on said plane level, increases as groove is deeper (see FIG. 5), so that a dihedral angle equal to or smaller than 90° is formed between these both legs and adjacent sections of bottom 17", anyhow within this angle corresponding legs of the "O-ring" are wedged due to the effects of said natural resilient reaction, for said "O-ring" is tightly fitted through the spandrel for further expansion once it is inside thereof.

Groove 17 depth is uniform thorough the whole contour-flank 17' thereof, the "O-ring" 18 being beside it, but also depth is such that said "O-ring" 18 remains protruding in a substantial degree, so that maximum values for backlash that may result between shutter side cylindrical surface and its housing may be compensated.

In FIG. 5 it may be seen a configuration that circular transversal section of "O-ring" acquires when being compressed against the shutter body, so a completely airtight seal is obtained around outlet 13" of shutter between the side cylindrical surface thereof and the surface of the wall of the head body encircling same, and more exactly, between the groove bottom and the flank thereof.

Taper of said flank of the groove on these opposite legs thereof at level of said transversal plane T—T is maintained upwards and downwards thereof, even when it gradually decreases towards the ends matching the diameter parallel to hole axis.

Virtually at the level of said plane, flank profile is radial relative to the housing-hole (FIG. 5'), it further becoming wider till it reaches a perpendicular position relative to said axis (FIG. 4").

Now, said particular conformation of said flank 17' not only intends to hold "O-ring", but to hold it back in order to avoid that, when being compressed by shutter, its section gets a configuration tending to destroy it as it would happen if said flank were defined by cylindrical surface of the axis perpendicular to hole axis.

In other words, it is an object to hold the "O-ring" back so that the section deformed by shutter maintains a curve-convex contour, without edges.

Another particular feature of these improvements lies in the inventive embodiment adopted to obtain said groove 17 housing "O-ring" 18 on the internal surface of housing-hole 3 of head b, which is described according a first example illustrated in FIGS. 4 to 8.

Wall 19 of head presents an internal recess 20 matching said section 17 starting at the bottom base 5 thereof, having a substantially uniform width, wider than that required by said housing, and rising up higher than the upper edge thereof, which results in a recess or embedding 20 of the rectangular, curve-concave configuration with two straight, longitudinal, and plan flanks 20', radially oriented towards the geometrical axis of head (FIG. 5) and an upper curve-concave end 20", being also plane, perpendicular to said axis (FIGS. 4–4').

Figure 8:
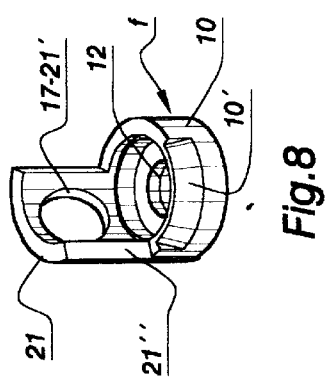
FIG. 8 shows a perspective view of a dummy carrier piece wherein the "O-ring" is applied to seal shutter outlet.

Matching said recess-embedding 20, side wall 10 of cap f applied on bottom base 5 of head b presents a longitudinal projection 21; said projection follows a curvature thereof, which, in turn, matches that of the bottom of said recess, and rises filling the cap throughout its full width and height, so it becomes substantially full, thus restoring the concave-cylindrical internal surface of the wall, and also of hole 3 that houses the spindle-shutter c, encircled by this embedding (FIG. 8).

In this projection 21, which should be considered as a true insert in half-cane, having an angle larger than ninety degrees, a boring 21' is formed, which reproduces said recess 17' for housing "O-ring" 18 which is intended to be obtained in said wall, bottom thereof is the embedding 20 itself wherein it is inserted, it is to say wall 19 of the head (FIGS. 4 to 8).

Said boring 21' reproducing recess 17, has the same flank 17' which has been referred to regarding schematic FIGS. 4" and 5'. obviously, said dummy piece carrying the "O-ring", which is an integral part of cap f, is held against rotation when side edges 21" thereof laterally stop against the longitudinal flanks 20' of embedding 20 where it is housed.

It should be noted that wall 10 of cap f that provides this insert 21, presents an oblique cut 10' in the section matching said duct 14 of wall 19 in said cartridge-head, so that it does not necks down fluid outflow from said outflow spout 15.

Within the scope of this invention a very interesting variation has been provided for as regards the described embodiment, comprising:

On one side, outlet 13" of duct 13 of spindle is circular, same as the recess-embedding 17 formed on wall 19 of head is circular, and therefore the configuration of "O-ring" 18 is also circular.

Figure 23:
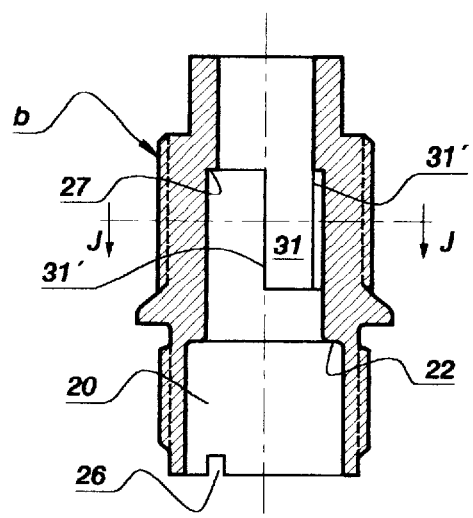
FIG. 23 shows a longitudinal section view taken along line I—I of only the body of the cartridge-head, showing the way the engagement for said dummy piece carrying the "O-ring" and a protrusion defining the stops of said head that determine both closing and opening positions of the shutter cooperatively with those of the spindle are formed within the housing-hole.
Figure 23:
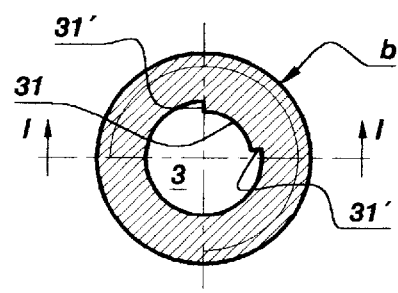

On the other side, recess-embedding 20 of said wall 19, wherein said dummy piece formed by projection 21 of the wall of cap f is adapted (FIG. 23), now comprises the whole section of said housing-hole 3, thus determining a cylindrical widening thereof, which in this way forms an embedding 22 having annular section for this piece; said piece matches said embedding 22, and so is formed by a tube-shaped projection 23 of cap f which is adapted within said widening-embedding and fully encircles it, always making an only piece with said cap, as can be seen in the drawings (FIGS. 13 to 17 and 24).

Said groove 17 for "O-ring" fitting 18 also has a circular configuration and, same as in the previous case, is formed by a boring 23' of said cap projection, which bottom is a section of the cylindrical surface of said widening-embedding 22 of housing-hole 3.

On the other side, flank 17' of said recess 17 has the same configuration as explained in schematic arrangement of FIGS. 4" and 5' in the practical embodiment of FIGS. 4 to 7.

If the wall of said tube-shaped insert piece 23 is not to block outlet 13" in duct of the spindle-shutter when being in the opening position, it is to say in the outflow position, it is furnished with a wide boring 24; said boring not only opens to said hole, but results to be said water trap 14 from the wall that allows the fluid to flow towards outlet a'" of said chamber, since it protrudes beneath the bottom base 5 of head and has its lower marginal portion 24' obliquely cut, so fluid may flow through this bottom base of the head, same as in the previous embodiment, this cut edge matches the edge of wall 10 of the cap, relative to which said tube-shaped projection 23 rises.

As it can be easily understood and seen in the drawings, said tube-shaped projection 23 is, in this example, a protrusion from said wall 10 of cap f.

Two of said borings 24 has been provided equally out of phase towards both sides of the median longitudinal plane passing through the center of the hole-boring 21 that defines the recess 17 for the "O-ring" 18, so spindle-shutter d may open fluid outlet turning both, right and left of the closing position where outlet 13" of duct 13 matches said recess 17 which provides the shutting section.

In order to facilitate water flow, both in this example and in the previous one, a cut 5" on the lower base 5 of the body of the head-cartridge b has been provided for.

To ensure that said tube-shaped piece 23 and recess 17 for fitting of "O-ring" 18 remain in the correct arrangement in operative relation to the closing position of spindle-shutter d, it has been provided to hold it back against rotation within head b, by two stems 25 radially protruding at the lower level of wall 10 of cap f, and adapting in cooperative nooks or notches 26 provided on bottom base 5 of the head body.

Said axial retention of the spindle-shutter assembly relative to the head and the opening and closing positions of spindle-shutter c–d relative to head b, are established by means of cooperative stops in both of them formed as follows:

Upper end of housing-hole 3 of spindle d presents a narrowing which defines an internal annular step 27, to which a step 28 of stem d is opposed at a certain distance, determined by a reduction in the cross-section thereof, placed higher than "O-ring" 7 that matches said hole narrowing and keeps till it reaches outer end stem 6'".

With both elements so made, said axial stop between the spindle-shutter piece c–d and head b, is established from inside towards outside on its upper base 4, through an over-thickness 29 of spindle that longitudinally comprises the gap between both steps 27 and 28, defining, in the spindle, an upper end step 29' stopping against said step 27 of said hole 3, while in cross-section comprises a 180° arc defining both longitudinal flanks 30 of lateral stop against flanks 31' of an internal protrusion 31 on said hole, by means of which the opening and closing positions of said spindle-shutter are established, out of phase between each other in a 102° angle (FIGS. 18–21–23–23'–24).

Finally, even when it is not a feature of these improvements, head b is preferably screwed into chamber a' of valve body a, thus establishing an airtight joint between the spandrel of said chamber and said head body, by means of an "O-ring" 32 fitted into an external throat thereof, beneath an annular step 33 which will fit said "O-ring" into said spandrel, as can be seen in FIG. 25.

As from the explanation and illustration above, it is clear that the invented improvements provide a true, effective solution to the drawback of airtight sealing proper of this kind of valves, especially when the head, spindle and shutter are molded in plastic material; as already stated said drawback is to ensure a perfect watertightness when the shutter is in the closing position, irrespective of the degree of fitting that may be obtained with the pieces as they come out of the die.

The object is to assembly these pieces without any prior fitting or finishing thereon, and this has been done in practice and at a minimum cost applying the referred improvements.

On the other side, it should be noted that the invented improvements provide a cartridge-head b that may be used to replace metal and/or ceramic heads, which apart from simplicity involve proportionally lower costs as compared to those heads, and also ensures identical sealing efficacy tested in hundreds of thousands of operation cycles.

It is the components of the construction above that maintain it assembled with no need of employing any retention element therebetween, as described herebelow:

On one side, natural resilient reaction of "O-ring" 7 establishes enough friction to keep spindle-shutter c–d retained in head b.

On the other side, also due to the effects of natural resilient reaction of "O-ring" 18 between spindle-shutter and wall 19 of head a through boring 23' of the tube-shaped piece 23 where it is applied, it also ensures said retention between spindle and head, while holding this piece back and, therefore, cap f of which it is an integral part, maintaining it applied against the lower end 8 of spindle c–d through its "O-ring" 9.

When head b so assembled fits into chamber a" of valve body a, it presses cap f through its tube-shaped protrusion 23, and airtightly fits it over bed 1 of inlet a' through "O-ring" 11, while at the same time it presses against step 29' of spindle through its own internal step 27 internally fitting its lower end 8 into cap f through "O-ring" 9, thus achieving a completely airtight sealing between all elements, which prevents any leakage but does not block free rotation of the spindle in either direction.

As from what has been explained and illustrated it is apparent that the invented improvements provide a true, effective solution to the drawback of getting a completely airtight sealing of the shutter in its closing position, irrespective of whether there is a fitting between its body and the piece that supplies the respective bedding therefor, the result of which is that both pieces or elements may be molded in plastic material, provided that their dies are capable to achieve a good finishing that allows free sliding over the sealing means, irrespective of the backlash that may exist between shutter and its embedding, obviously within the limits that "O-ring" 18 somehow imposes.

While the nature and scope of the present invention have been described and determined, as well as the way of implementing it, we claim property and exclusive right as follows:

1. Improvements in general-purpose valves; wherein liquid flow is controlled by partially rotating a lever arm; the valves comprising a valve body with a fluid inlet placed at the bottom of a head housing chamber as a removable cartridge of an assembly of a corresponding shutter operatively related to an intercommunicating duct from said inlet to an outlet to this chamber; said cartridge-head being removably fitted into said chamber, airtightly fitting on a spandrel above the level of said outlet and on its lower base, around said inlet; characterized in that said fitting is established by means of a complementary cap attached to this base with a central hole that matches both said inlet and the inlet hole of said intercommunicating duct formed on shutter body which is slip inserted into a hole housing said shutter and its actuating spindle; the hole ranges along said head; these elements are assembled to form an assembly axially held against said head, with free turning to shift between closing and opening positions, which are out of phase between each other by, at least, ¼-turn and determined by cooperative stops of both of them; the shutter being airtightly fitted by its lower end within said cap, while said spindle runs in the opposite direction through sealing means and protrudes from the head lower base and ends in a socket wherein, said lever arm is attached; said intercommunicating duct has an outlet placed on shutter side wall; the outlet is opposite to the surface of said housing-hole of the head, which presents a shutting section for said outlet relative to the closing position of said spindle-shutter assembly; the shutting section is completely encircled by an "O-ring" applied in a groove of the wall of said hole, an airtight seal between both surfaces around this outlet is established, said housing hole includes an access mouth to a water trap coming from its outlet, relative to the opening position of the spindle-shutter, said access mouth is formed on the head body and in permanent communication with the outlet of chamber through an opening on the lower base thereof.

2. Improvements in general-purpose valves, according to claim 1, characterized in that said spindle and said shutter are formed by both legs of a single elongated, rectilinear body of a proportionally narrow circular section, inserted into said housing-hole through the end hole of the lower base of the head, thus establishing an axial stop from said base to the upper base, between cooperative internal steps of both of them; the lower end of the shutting leg of said spindle, which protrudes from said lower base, remains inserted into said cap which is, in turn, partially inserted in a cooperative engagement of said base, the engagement is formed by a widening of said hole, establishing axial stop from outside towards inside between the periphery of its side wall and the step determined by said widening.

3. Improvements in general-purpose valves, according to claim 1, characterized in that said lower end of the shutting leg is inserted into the cap through sealing means formed by an "O-ring" applied on a recess of said leg.

4. Improvements in general-purpose valves, according to claim 1, characterized in that said sealing means through which the spindle spreads, are intermediate between the spindle and the shutter body, the sealing means is formed by, at least, an "O-ring" applied on a throat of the spindle-shutter assembly, thus sealing the joint between them and the surface of said housing-hole of the head.

5. Improvements in general-purpose valves, according to claim 1, characterized in that said intercommunication duct of shutter is formed by a longitudinal hole thereof in coaxial prolongation relative to virtual turning axis of the shutter-spindle assembly; said hole opened through an inlet placed on the lower end of shutter body which is inserted into said cap; said hole-duct finishes in a blind upper end, with a side outlet is opened on the side surface of the shutter; the hole placed between the lower end thereof and said sealing means through which the spindle passes; said outlet is defined by a transversal hole of the shutter body.

6. Improvements in general-purpose valves, according to claim 1, characterized in that the inner edge of said groove on the wall of the housing-hole, wherein the "O-ring" sealing the joint between the shutter body and said wall is applied, around the outlet of the intercommunicating duct; is configured as results from the intersection of a virtual cylinder, perpendicular relative to said housing-hole, having the concave-cylindrical surface proper of said housing-hole, which diameter is larger than the outlet of said duct, with a concave-cylindrical bottom of the axis that matches the axis of said hole.

7. Improvements in general-purpose valves, according to claim 1, characterized in that said "O-ring" sealing the joint between the housing-hole of the head and the shutter inserted in said head, around the outlet of said intercommunication duct, is applied in a groove of the wall of said hole, the groove is formed in a dummy piece inserted in a cooperative engagement groove for said dummy piece, the groove is opened on the lower base of the head body against which this piece is held back from rotation relative thereof.

8. Improvements in general-purpose valves, according to claim 7, characterized in that said dummy piece is formed by a protrusion of the cap wall which is inserted into the hole of the housing-hole on the lower base of the head body.

9. Improvements in general-purpose valves, according to claim 8, wherein said dummy piece is half-cane shaped, longitudinally oriented, having an angle larger than that of the outlet in the intercommunicating duct, on the side surface of shutter; said piece presents both longitudinal flanks which establish a side stop with the cooperative flanks of the engagement on the wall of the valve body where the piece is inserted into.

10. Improvements in general-purpose valves, according to claim 9, characterized in that the groove for the "O-ring" formed on said dummy piece is formed by a boring which runs through the whole thickness thereof which bottom is the concave-cylindrical bottom of the engagement for said boring that is formed on the wall of the valve body.

11. Improvements in general-purpose valves, according to claim 7, characterized in that said dummy piece is formed by a tube-shaped prolongation from the side wall of cap; the prolongation fully encircles the piece and fits it into the engagement groove formed on the internal side of the wall of the head body defined by a widening of the lower leg of the housing-hole where the shutter fits; most length of shutter remains within said tube-shaped prolongation from the cap.

12. Improvements in general-purpose valves, according to claim 11, characterized in that said recess for the "O-ring" formed on said dummy piece, is defined by a wide boring on said tube-shaped prolongation of the cap; which bottom is the concave-cylindrical surface of the widening of the housing-hole where said piece is inserted into.

13. Improvements in general-purpose valves, according to claim 11, characterized in that said tube-shape prolongation of the cap that forms the dummy piece where the recess housing the "O-ring" is formed, is held back against rotation relative to the body of the head in the position where said "O-ring" matches shutter outlet.

14. Improvements in general-purpose valves, according to claim 13, characterized in that said dummy piece is held back by means of, at least, a protrusion formed by a radial end projection of the part of the side wall of cap that is inserted in the lower end of the housing-hole for the shutter opened on the lower base of the head body; this protrusion is axially inserted into a cooperative hollow of said base.

15. Improvements in general-purpose valves, according to claim 1, characterized in that said access mouth to the water trap and the water trap are formed by an internal hollow of the wall of said housing-hole of shutter, opened on the lower base of the head body, on a side of said cap.

16. Improvements in general-purpose valves, according to claim 1, characterized in that fitting of the lower base of the head around chamber inlet of valve body is established by means of a complementary cap fitted to this base with a central hole that matches both, said inlet and the inlet of said intercommunicating duct formed on the shutter body which is slip inserted into a hole that houses the shutter and the actuating spindle; the hole runs along said head; these elements so assembled form an assembly axially held back against said head, having free rotation between the closing and the opening positions, out of phase between each other, at least, ¼-turn-; said positions are determined by cooperative stops of them both, and the shutter is airtightly fitted by its lower end into said cap, while the spindle runs in the opposite directions passes through sealing means and protrudes from the upper base of head and finishes in a socket where the lever arm is attached; said intercommunication duct has an outlet placed on the side surface of shutter, said outlet facing the surface of said housing-hole of head; said housing-hole presents a shutting section of said outlet relative to the closing position of this spindle-shutter assembly; said shutting section is completely encircled by an "O-ring" applied to a groove of the wall of said hole, thus establishing a airtight seal between both surfaces around said outlet; said groove is formed in a dummy piece inserted into a cooperative engagement recess for said piece; the recess is formed by a widening of said housing-hole opened on the lower base of the cartridge; said piece is formed by a tube-shaped prolongation of the wall of said cap, where the "O-ring" is applied in a boring of said wall which bottom is the surface of said widening, said piece is held back against rotation facing cartridge wall when shutter is in the opening position; said hole includes a housing, relative to the opening position of shutter, and inlet to a water trap that comes from outlet, the housing formed in the head body and in permanent communication with the chamber outlet through an opening on the lower base thereof.

17. Improvements in general-purpose valves, according to claim 16, characterized in that said access mouth to water trap and water trap as well as formed by a second boring in a tube-shaped prolongation of the cap wall, said prolongation presents a hollow from the lower edge of said boring till the base thereof, thus defining a liquid flow between said wall and cartridge lower base towards the outlet of the valve body chamber.

18. Improvements in general-purpose valves, according to claim 1, characterized in that said spindle-shutter assembly is axially held back in one direction, towards the lower base, by means of a stop between said assembly and said cap, and, crosswise, against the chamber bedding that encircles the inlet, said cap is fastened by means of an "O-ring" and, in the other direction, also towards the upper base by direct stop of said assembly and cooperative means proper of said head.

19. Improvements in general-purpose valves, according to claim 18, characterized in that said cooperative means of axial stop of the spindle-shutter assembly with the head are formed by an annular step of the housing-hole in the portion of its upper base in said head; the step is defined by a narrowing thereof; and in the spindle-shutter assembly by another annular step thereof defined by a reduction of the transversal section of the spindle relative to the shutter, thus defining a step opposite at a certain distance to the step of said hole, so direct stop between both steps is established by means of an over-thickness of spindle, which extends alongside encircling the gap between both steps, thus forming a protrusion that defines its own step of direct stop against said step in the hole by the upper end thereof.

20. Improvements in general-purpose valves, according to claim 19, characterized in that said over thickness-protrusion of spindle has a cross-section comprising a 180°- wide arc, the arc defines both longitudinal flanks of side stop against the flanks of an internal protrusion of said hole having an angle smaller than 90°, through which the opening and closing positions of the spindle-shutter are established, out of phase between each other by a 102° angle.

* * * * *